US011309710B2

(12) United States Patent
Leontitsis et al.

(10) Patent No.: US 11,309,710 B2
(45) Date of Patent: Apr. 19, 2022

(54) METHOD AND SYSTEM FOR ASSESSING USAGE OF DEVICES OF A PROPERTY

(71) Applicant: BRITISH GAS TRADING LIMITED, Windsor (GB)

(72) Inventors: Alexandros Leontitsis, Sutton (GB); Oliver Parson, London (GB)

(73) Assignee: BRITISH GAS TRADING LIMITED, Windsor (GB)

( * ) Notice: Subject to any disclaimer, the term of this patent is extended or adjusted under 35 U.S.C. 154(b) by 613 days.

(21) Appl. No.: 15/768,387

(22) PCT Filed: Oct. 13, 2016

(86) PCT No.: PCT/GB2016/053175
§ 371 (c)(1),
(2) Date: Apr. 13, 2018

(87) PCT Pub. No.: WO2017/064494
PCT Pub. Date: Apr. 20, 2017

(65) Prior Publication Data
US 2018/0285988 A1  Oct. 4, 2018

(30) Foreign Application Priority Data

Oct. 14, 2015  (GB) ...................................... 1518211
Sep. 1, 2016   (GB) ...................................... 1614870

(51) Int. Cl.
*G06Q 50/06* (2012.01)
*H02J 3/14* (2006.01)
(Continued)

(52) U.S. Cl.
CPC ................ *H02J 3/14* (2013.01); *G01D 4/002* (2013.01); *G01D 4/004* (2013.01); *G01D 4/006* (2013.01);
(Continued)

(58) Field of Classification Search
CPC .......... H02J 3/14; H02J 3/003; H02J 2310/14; G01D 4/004; G01D 4/006; G01D 4/008;
(Continued)

(56) References Cited

U.S. PATENT DOCUMENTS 8,825,583 B2 * 9/2014 Sanchez Loureda .. G06Q 50/06
706/50
9,190,844 B2 * 11/2015 Tran ........................ H02J 3/004
(Continued)

FOREIGN PATENT DOCUMENTS

EP    2026299 A1    2/2009
EP    2535997 A2    12/2012
(Continued)

OTHER PUBLICATIONS

PCT International Search Report and Written Opinion from the International Application PCT/GB2016/053173, dated Nov. 29, 2016, 11 pages.
(Continued)

*Primary Examiner* — Eyob Hagos
(74) *Attorney, Agent, or Firm* — Tucker Ellis LLP; Michael G. Craig

(57) ABSTRACT

In one aspect, there is provided a method comprising: receiving consumption data comprising readings from one or more utility meters associated with a property comprising one or more devices, the one or more devices comprising one or more devices of interest; determining, in the received consumption data, one or more positive consumption variations indicative of switching on of one or more of the devices and/or one or more negative consumption variations indicative of switching off of one or more of the devices; identifying one or more events associated with the one or more devices, based on the determined variations, by matching one or more positive variations with one or more
(Continued)

negative variations; grouping the identified one or more events into one or more blocks, each block corresponding to an occurrence of usage of a device of the property; classifying the one or more blocks into one or more predetermined clusters, the one or more predetermined clusters comprising a respective predetermined cluster associated with each device of interest of the property; and determining an occurrence and/or an absence of usage of the one or more devices of interest of the property, based on the classification into the one or more predetermined clusters.

20 Claims, 9 Drawing Sheets

(51) Int. Cl.
  G06Q 10/04 (2012.01)
  G01D 4/00 (2006.01)
  *H02J 3/00* (2006.01)
  *G06Q 10/06* (2012.01)

(52) U.S. Cl.
  CPC ............. G01D 4/008 (2013.01); G06Q 10/04 (2013.01); G06Q 50/06 (2013.01); *G06Q 10/06315* (2013.01); *H02J 3/003* (2020.01); *H02J 2310/14* (2020.01)

(58) Field of Classification Search
  CPC ........ G01D 4/002; G06Q 10/04; G06Q 50/06; G06Q 10/06315; Y04S 20/30; Y04S 20/34; Y02B 90/241
  See application file for complete search history.

(56) References Cited

U.S. PATENT DOCUMENTS

| | | | | |
|---|---|---|---|---|
| 2006/0261962 | A1* | 11/2006 | Berenguer | G08B 21/0423 340/573.1 |
| 2011/0004421 | A1* | 1/2011 | Rosewell | G01D 4/002 702/45 |
| 2011/0301894 | A1 | 12/2011 | Sanderford, Jr. | |
| 2011/0302125 | A1 | 12/2011 | Shetty et al. | |
| 2012/0278272 | A1* | 11/2012 | Kim | G06F 11/3013 706/52 |
| 2014/0107850 | A1* | 4/2014 | Curtis | H02J 13/00001 700/291 |
| 2014/0172772 | A1* | 6/2014 | Sanchez Loureda | G01D 4/00 706/52 |
| 2015/0332294 | A1* | 11/2015 | Albert | G06Q 30/0202 705/7.31 |
| 2017/0074913 | A1* | 3/2017 | Saito | G01R 21/00 |

FOREIGN PATENT DOCUMENTS

| | | |
|---|---|---|
| GB | 2475172 A | 5/2011 |
| GB | 2491109 A | 4/2017 |
| WO | 2012/106709 A2 | 8/2012 |
| WO | 2012156758 A1 | 11/2012 |
| WO | 2015/059272 A1 | 4/2015 |
| WO | 2015/073997 A2 | 5/2015 |
| WO | 2015073997 A2 | 5/2015 |

OTHER PUBLICATIONS

PCT International Search Report and Written Opinion from the International Application PCT/GB2016/053175, dated Nov. 29, 2016, 11 pages.

United Kingdom, UK Search Report for GB1518211.6, dated Apr. 13, 2016, 4 pages.

United Kingdom, UK Search Report for GB1614870.2 dated Feb. 17, 2017, 5 pages.

EP Communication pursuant to Article 94(3) from the corresponding European Patent Application No. 16784249.1, dated Jun. 29, 2021, 10 pages.

EP Communication pursuant to Article 94(3) from the corresponding European Patent Application No. 16784250.9, dated Jun. 29, 2021, 8 pages.

* cited by examiner

METHOD AND SYSTEM FOR ASSESSING USAGE OF DEVICES OF A PROPERTY

CROSS-REFERENCE TO RELATED APPLICATIONS

This application claims priority to Great Britain Patent Application Serial No. 1614870.2 entitled METHOD AND SYSTEM FOR ASSESSING USAGE OF DEVICES OF A PROPERTY, filed Sep. 1, 2016, which claims priority to Great Britain Patent Application Serial No. 1518211.6 entitled METHOD AND SYSTEM FOR DETERMINING ENERGY CONSUMPTION OF A PROPERTY, filed Oct. 14, 2015, all of which are incorporated herein by reference.

BACKGROUND

This disclosure relates, but is not limited, to a method, a computer readable medium, a system or apparatus for assessing usage of devices associated with a property.

It is known to provide feedback about usage of appliances to a client associated with a property comprising a plurality of appliances, using monitoring energy consumption of one or more appliances within the property.

However the above known techniques require data from at least one sensor connected to the appliance for the monitoring of the energy consumption of one or more appliances within said property. Such sensor and/or data may be difficult to obtain.

SUMMARY

Aspects and embodiments of the invention are set out in the appended claims. These and other aspects and embodiments of the invention are also described herein.

The disclosure relates to a method for assessing usage of devices of a property.

The method comprises receiving consumption data (such as energy consumption data as a non-limiting example) from one or more utility meters associated with the property, and determining variations indicative of switching on or off of devices of the property. The method also comprises identifying one or more events associated with the devices, based on the determined variations, grouping the identified events into blocks representative of usages of the devices, and classifying the blocks into predetermined clusters associated with the devices. The method also comprises determining an occurrence and/or an absence of usage of the devices, based on the classification into the one or more predetermined clusters.

In some examples the method may thus enable detection of changes (such as step changes) in readings from meters of utility supply associated with a property. In some examples the method may pair corresponding 'on' and 'off' changes to form events, and may collect similar events occurring during a short space of time to form blocks. In some examples the blocks may be filtered and clustered to learn distributions over various features, such as the duration of the block, for each property. In some examples the learned features are used to classify each block as a specific device, and thus enable detection of usage of the specific device. In some examples the method may be applied to any utility provided to the property, and may also enable detection of the flush of a toilet from readings from a water meter and/or detection of a use of hot water (e.g. from an on-demand boiler) to wash hands from readings from a gas meter.

The method may also comprise comparing the determined occurrence and/or absence of usage of the one or more devices of interest of the property with one or more predetermined usage patterns associated with the one or more devices of interest of the property, and determining whether the determined occurrence and/or absence of usage of the one or more devices of interest of the property is associated with normal or abnormal usage, based on the comparison.

In some examples, the method may use a history of device usage, enabled by the detection of usage of the specific device of the property, to learn the typical pattern of usage of the specific device. In some examples, the learned pattern may be used to detect deviations from the normal routine, such as the absence of appliance usage during the day and/or the presence of appliance usage during the night. In some examples, the method may enable gradual deviations from routines.

The method may further comprise causing output of one or more alarm signals, based on the determining whether the occurrence and/or absence of usage is associated with normal or abnormal usage.

In some examples, the method may be used to produce an alert of abnormal behaviour. In some examples, the method may enable to detect deviations from a normal routine of users living in the property, and for example who may require some level of care. Non-limiting examples of such users may include elderly people and/or people with dementia. In some examples the method may use the detection of the deviations from the normal routine to allow timely interventions (e.g. a text message, a phone call or a visit to the property) from a carer (e.g. a relative or professional carer). In some examples, the detection of gradual deviations from routines may be used to determine whether or not the user is still fit to live on their own in the property.

In some examples the method may further comprise receiving context information about the property, such as information about the devices (such as the type of the devices) and/or information from sensors in the property (such as sensors associated with closed circuit television and/or access to the property).

In some examples, for the determining of the occurrence and/or the absence of usage of the one or more devices of interest of the property, the consumption data may be received or collected by periods of the order of the minute (such as e.g. every half hour or every minute or less) or in real time or near real time (such as e.g. a period for reception or collection of the consumption data may be of the order of the second, such as every 10 seconds or less). Other periods may be envisaged.

In some examples, for the determining of the predetermined usage patterns, the consumption data may be received retrospectively or collected periodically and over a predetermined observation period of time. In some examples the analysis of the received and collected data may be performed retrospectively. The period between each reading may be relatively short, such as every hour or shorter, such as every minute or 10 seconds as non-limiting examples, and the predetermined observation period of time may be relatively long, such as for example a half day or several days (such as a week) or longer (such as two months).

The disclosure also relates to a system, a computer program product and apparatus for implementing the method.

BRIEF DESCRIPTION OF DRAWINGS

Embodiments of the present invention will now be described, by way of example, with reference to the accompanying drawings, in which.

DETAILED DESCRIPTION OF EXAMPLE EMBODIMENTS

Figure 1:
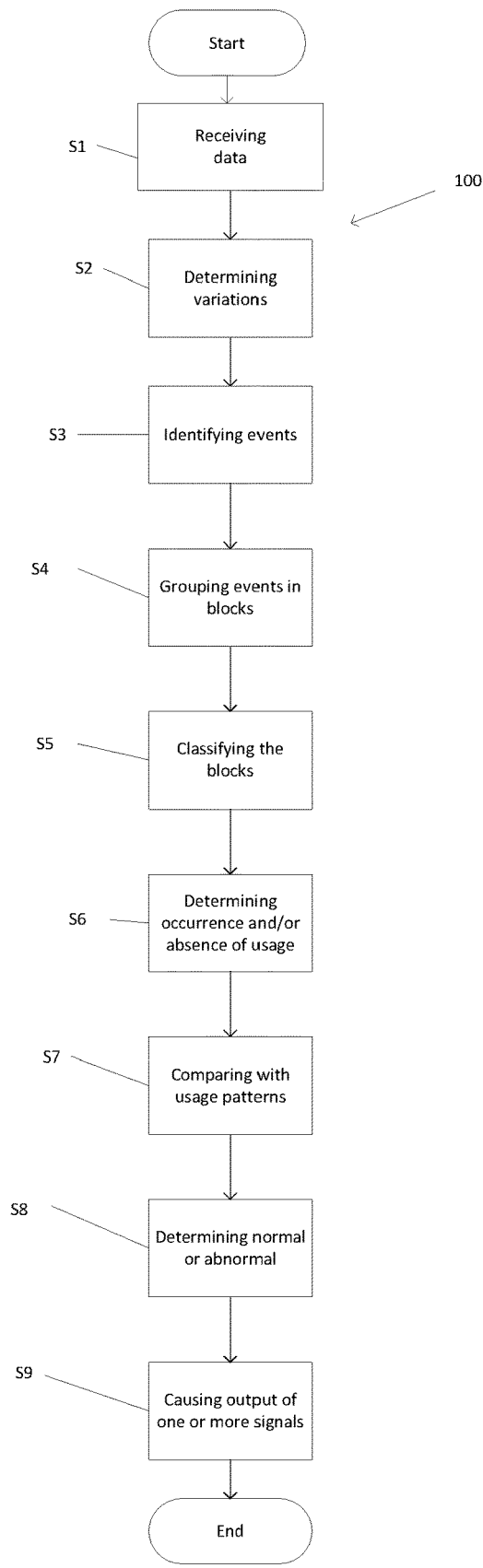
FIG. 1 shows a flow chart illustrating an example method according to the disclosure.

The example illustrated in FIG. 1 shows a flow chart illustrating an example method 100 according to the disclosure.

The method 100 of FIG. 1 comprises receiving, in S1, data.

In some examples, the receiving of the data of S1 may comprise receiving consumption data comprising readings from one or more utility meters associated with a property comprising one or more devices. As explained below, the devices of the property may comprise one or more devices of interest. The method of the disclosure applies to any type of utility and utility meter. In some non-limiting examples, the utility meters may comprise a gas meter and/or an electricity meter and/or a water meter and/or a bandwidth meter.

In some examples and as explained in greater detail below, the receiving of the data of S1 may optionally comprise receiving context information about the property.

The method 100 comprises determining, in S2, in the received consumption data, one or more positive consumption variations indicative of switching on of one or more of the devices and/or one or more negative consumption variations indicative of switching off of one or more of the devices.

The method 100 also comprises, in S3, identifying one or more events associated with the devices, based on the determined variations, by matching one or more positive variations with one or more negative variations.

The method 100 also comprises, in S4, grouping the identified one or more events into one or more blocks, each block corresponding to an occurrence of usage of a device of the property.

The method 100 also comprises, in S5, classifying the one or more blocks into one or more predetermined clusters, the one or more predetermined clusters comprising a respective predetermined cluster associated with each device of interest of the property.

The method 100 also comprises, in S6, determining an occurrence and/or an absence of usage of the one or more devices of interest of the property, based on the classification into the one or more predetermined clusters.

In the example of FIG. 1, the method 100 may also comprise, in S7, comparing the determined occurrence and/or absence of usage of the one or more devices of interest of the property with one or more predetermined usage patterns associated with the one or more devices of interest of the property.

In the example of FIG. 1, the method 100 may also comprise, in S8, determining whether the determined occurrence and/or absence of usage of the one or more devices of interest of the property is associated with normal or abnormal usage, based on the comparison.

In some examples, the method 100 may further comprise, in S9, causing output of one or more alarm signals. In some examples, the output of the one or more signals may be based on the determining whether the occurrence and/or absence of usage is associated with normal or abnormal usage. In some examples, the one or more signals may be output regardless of the determining whether the occurrence and/or absence of usage is associated with normal or abnormal usage, e.g. in case of an emergency. In some examples, the method may comprise receiving, from a user of the property and/or an operator, a cancellation signal overriding the one or more output alarm signals, e.g. to avoid false alarms.

Figure 2:
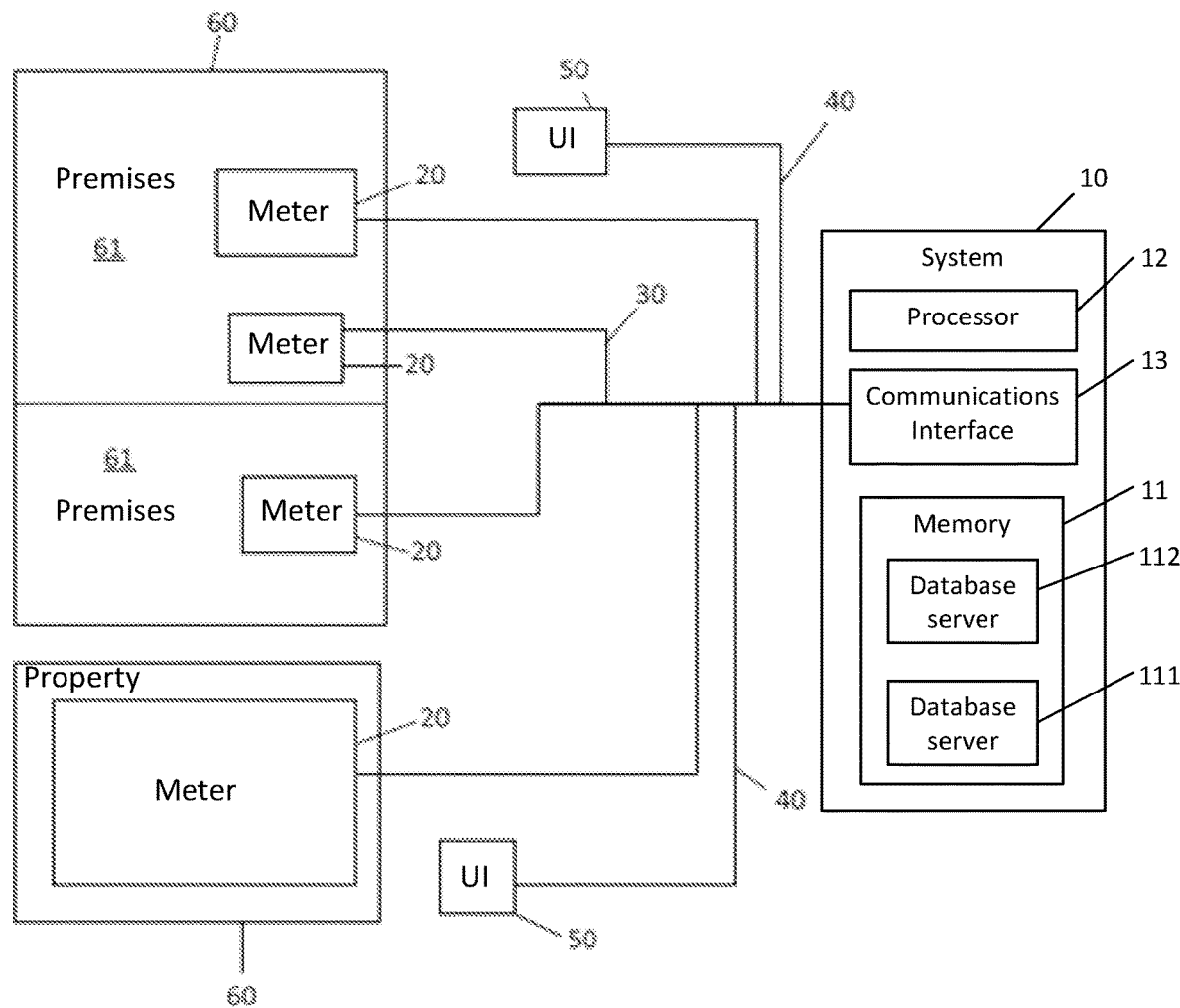
FIG. 2 schematically illustrates an example system configured to implement the example method of FIG. 1.

FIG. 2 schematically illustrates an example system 10 configured to implement the example method of FIG. 1.

The system 10 of FIG. 2 comprises at least a memory 11, a processor 12 and a communications interface 13.

The memory 11 is configured to store data, for example for use by the processor 12.

In FIG. 2, the system 10 is configured to communicate with one or more meters 20, via the interface 13 and a first link 30 between the interface 13 and the meters 20.

The memory 11 may also comprise a first database server 111 configured to store data received from the meters 20 over the link 30.

The system 10 of FIG. 2 is also configured to be connected to one or more user interfaces 50, via the interface 13 and a second link 40 between the interface 13 and the user interfaces 50.

The memory 11 may also comprise a second database server 112 configured to store data received from the user interfaces 50 over the link 40.

In FIG. 2, each of the meters 20 is a utility meter, such as one of a water meter and/or a bandwidth meter and/or a gas meter and/or an electricity meter. At least some of the meters are configured to generate one or more readings comprising energy consumption data. In some example, the energy consumption data may be associated with energy (for example in kW·h (kWh)) and/or power (for example in Watts or kiloWatts) and/or volume of gas (for example in cubic meters). At least some of the meters are configured to generate one or more readings comprising other types of consumption data. In some example, the energy consumption data may be associated with bandwidth or rate (for example in MegaBytes/second) and/or bandwidth consumption (for example in MegaBytes) and/or volume (for example in cubic meters, e.g. for water).

In some examples, at least some of the meters 20 may comprise an automatic meter reading functionality. The automatic meter reading functionality may be configured to automatically collect the consumption data relating to the meter 20, and transfer the data to the system 10 over the first link 30. The period between each transfer may correspond, for examples, to a billing period, such as a month, a quarter, or a year as non-limiting examples.

In some examples, at least some of the meters 20 may be smart meters. The smart meters are meters comprising an automatic meter reading functionality, as well as other functionalities, for example for communication to the system 10, such as a short term readings (for example a reading may be generated every half hour or every 10 seconds) and/or real-time or near real-time readings, and/or power or utility outage notification and/or quality monitoring (e.g. power or bandwidth), as non-limiting examples.

In FIG. 2, the meters 20 are associated with a property 60. As shown in FIG. 2, a property 60 may comprise one or more meters 20.

As shown in FIG. 2, a property 60 may comprise one or more premises 61.

A contract with a utility provider (such as water and/or bandwidth and/or electricity and/or gas provider) may be associated with one or more premises 61 and/or one or more properties 60.

Devices consuming utility (such as energy, such as gas and/or electricity), are located within the property 60 and the meters 20 are configured to record the consumption of the devices.

The devices may comprise at least one of the following, as non-limiting examples, one or more of the following:

a heating system, such as a boiler and/or an electrical heater; and/or a cooling system, such as an air conditioning system; and/or a lighting system, such as a lighting bulb, and/or an appliance, such as a kettle, a fridge, a washing-machine, a drier, a dish-washer, an oven, a cooker, a hob, a hair drier, a blender, an alarm clock, a television, a set-top box, a dvd and/or cd player, a hoover, a computer, a telephone, and/or a bandwidth access point; and/or a water access point, such as a flush and/or a water tap.

In some examples, predetermined categories may be associated with the devices, and may comprise at least one of:

Appliances (associated with, for example, fridge, washing-machine, drier, dish-washer, hair drier, blender, alarm clock, hoover);

Cooking (associated with, for example, oven and/or cooker and/or hob);

Heating (associated with, for example, boiler and/or electrical heater);

Cooling (associated with, for example, air conditioning system);

Hot Water (associated with, for example, boiler and/or electrical heater);

Entertainment (associated with, for example, television, set-top box, dvd or cd player and/or wi-fi access points); and Lighting (such as lighting bulbs).

In some examples, sub-categories may be associated with the appliances, and may comprise at least one of: smaller appliances (such as fridge and alarm clock, as non-limiting examples) and larger appliances (such as washing machine and hoover, as non-limiting examples).

The user interface 50 may be a user interface of a communications device associated with a client associated to the property 60 and/or a device associated with an operator of the utility provider (such as water and/or electricity and/or gas) and/or a communications device associated with a third party. The communications device may comprise at least one of a computer, a telephone, such as a cell phone, a personal digital assistant (PDA), a laptop or electronic notebook, a smart phone, a tablet, any other type of smart device, and/or a server of the operator and/or a server of a third party, as non-limiting examples.

In some examples, the system 10 is configured to perform, at least partly, one or more of the steps of the method of FIG. 1.

The processor 12 of the system 10 may be configured to perform, at least partly, at least some of the steps of the above method. Alternatively or additionally, some of the steps of the above method may be performed, at least partly, by another entity in the system 10, such as the server 111 or 112 as non-limiting examples.

Figure 3A:
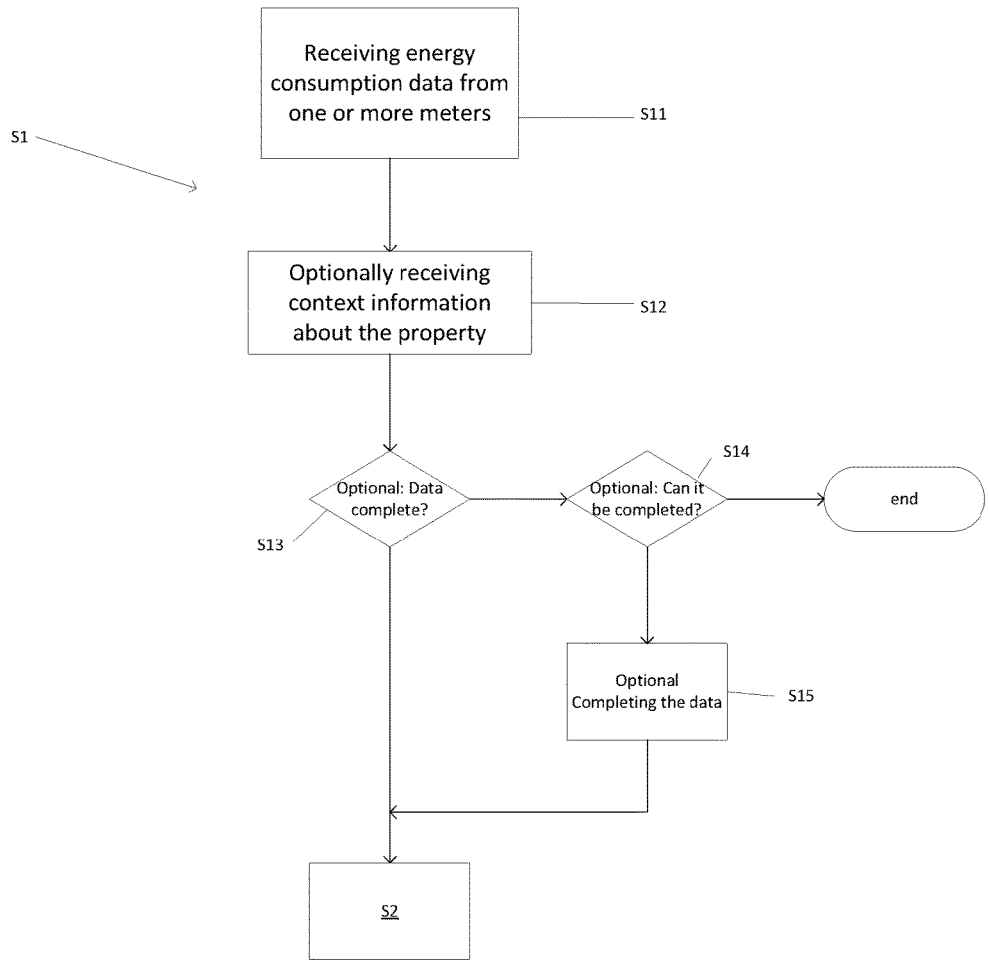
FIG. 3A shows a flow chart illustrating an example detail of a method according to the disclosure.

In the example of FIG. 3A, S1 may comprise, at S11, receiving readings from the meters. In some examples, the receiving may comprise periodically receiving readings from e.g. electricity and/or gas meters.

In some examples, the period between readings or for receiving the readings is of the order of the hour, that is to say that a reading is received or corresponds to every hour or every half hour. Alternatively or additionally, the period between readings or for receiving the readings is of the order of the minute, that is to say that a reading is received or corresponds to every ten minutes, or every two minutes or every minute. Alternatively or additionally, the period between readings or for receiving the readings is of the order of the second, that is to say that a reading is received or corresponds to every 30 seconds or every 10 seconds or every second.

In some examples, the readings may be received for a predetermined monitoring period of time, which may correspond to a period which is of the order of the year, such as a year or a half year, of the order of the month, such as 3 months (a quarter), or one month or a half month, or of the order of the day, such as a 7 days, or a day or a half day.

In the example of FIG. 3A, S1 may comprise, at S12, optionally receiving context information about the property.

In some examples, the context information about the property is at least one of:

information about the property; and information about the environment of the property.

In some examples, the information about the property comprises at least one of:

location of the property, such as a ZIP code, a postal code, GPS coordinates or an address; and/or a fuel type of the property, such as electricity, gas, both or none; and/or a profile of the property, such as a fuel type for cooking in the property, a fuel type for heating the property, a fuel type for cooling the property, and a fuel type for hot water in the property; and/or electricity and/or gas information about the property, such as the line voltage in at least part of the property and/or data from dedicated sensors or devices configured to monitor energy consumption and/or operation of one or more devices; and/or information about the devices, such as the type of the devices and the mode of operation of the devices and/or information based on history of browsing and/or usage of devices associated with users associated with the property; and/or information about clients associated with the property, such as number of clients, and location of the clients; and/or information from sensors in the property, such as sensors associated with closed circuit television and/or access to the property.

In some examples, the context information about the property may be provided to the system via the interfaces 50.

In some examples, the location of the property may be provided by a client associated with the property or inferred by an operator of the service provider from an address of the property.

In some examples, the fuel type of the property (electricity and/or gas) is usually known by an operator of of the service provider.

In some examples, the profile of the property may be provided by a client associated with the property, in response to a request by an operator for example.

In some examples, the electricity and/or gas information about the property may be provided by sensors associated with the property, such as line voltage sensors and/or data from dedicated sensors or devices configured to monitor energy consumption and/or operation (such as on/off) of one or more devices. In some examples, the electricity and/or gas information may be inferred by the operator from data provided by a device and/or a third party associated with both the client and the property. In some examples the operator may infer when heating and/or cooling is on from provided data associated with the temperature internal to the property and the set temperature of the thermostat.

In some examples, the information about the devices may be provided by a client associated with the property, in response to a request by an operator for example. The client may provide the information, such as the number of televisions within the property, the type and/or model of the washing machine or kettle, etc. Alternatively or additionally, the information about the devices may be inferred from an input from a third party (such as an internet service provider). In some cases, as non-limiting examples, tracking of internet browsing history of and/or online purchase may allow inferring information about the devices within the property, such as the type and/or model of a washing machine recently bought by the client.

In some examples, the information about the clients associated with the property may be provided by a client associated with the property, in response to a request by an operator for example. The client may provide input about the number of people usually living in the property. The client may also provide input about periods of holidays where the property is expected to be empty. Alternatively or additionally, the information about the clients may be inferred from an input from a third party (such as an internet service provider and/or mobile telephony providers, as non-limiting examples). In some cases, tracking of internet browsing history of and/or online purchase and/or mobile phone location may allow inferring information about the clients within the property, such as periods of expected holidays, location of the clients using mobile phone and/or Wi-Fi location tracking as non-limiting examples.

In some examples, the information about the environment of the property comprises at least one of:
time of the day and/or period of the year,
one or more weather readings,
a temperature associated with the outside temperature of the property, and/or
sun elevation and/or cloud coverage in relation to the property.

In some examples, the context information about the environment of the property may be provided to the system 10 via the link 30.

In some examples, the time of the day and/or the period of the year may be inferred by the operator from the readings provided by the meters 20.

Alternatively or additionally, in some examples, the context information about the environment of the property may be provided to the system 10 via the interfaces 50.

In some examples, the weather readings and/or the outside temperature and/or sun radiation and/or the cloud coverage in relation to the property may be provided by a third party (such as a meteorological provider).

Alternatively or additionally, in some examples, the location of the property may enable to infer at least part of the information about the environment of the property, such as one or more weather readings and/or a temperature associated with the outside temperature of the property and/or sun radiation and/or cloud coverage in relation to the property.

In the above examples, the third party may be automated, and may for instance comprise a server.

It is understood that the context information may allow more accurate:
identification of the one or more events, and/or
grouping of the events into groups, and/or
classification into the clusters, and/or
determination of the occurrence or absence, and/or
comparison with the usage patterns, and/or
determination of normal or abnormal usage.
Then S2 is performed.

The method may comprise an optional S13 between S12 and S2. At S13, it may be determined whether the received data is complete.

If it is determined at S13 that the data is complete, then S2 is performed.

If it is determined at S13 that the data is not complete, then the method may comprise an optional S14. It may be determined at S14 if the data can be completed.

If it is determined at S14 that the data cannot be completed, then the method outputs an incomplete data message and ends. For example, it is determined that the data cannot be completed when the amount of received consumption data is below a predetermined threshold, such as less than 50% of expected data.

If it is determined at S14 that the data can be completed, the method may comprise an optional S15. The data may be completed at S15 with missing data. Then S2 is performed.

Below is an example of a method which may be performed at the optional S15 for completing the data and which can be described with reference to FIG. 3B.

Figure 3B:
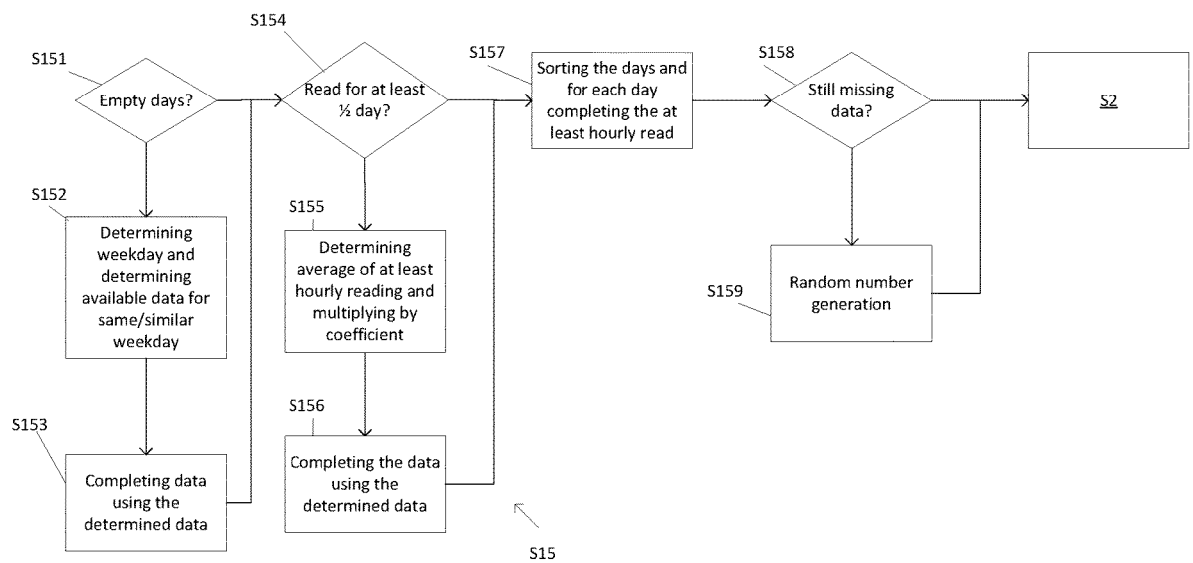
FIG. 3B shows a flow chart illustrating an example detail of a method for completing data according to the disclosure.

The method performed at S15 and illustrated by FIG. 3B may comprise determining at S151 if there are any days which are "empty days", i.e. days with no consumption data, such as no at least hourly readings (e.g. no Half-Hourly Readings) and no Read for a period of at least a Half-Day (i.e. the consumption for a predetermined period of time of at least one half day, such as e.g. a Daily Read). If it is determined at S151 that there are empty days in the data, then S152 may be performed, where the empty days may be completed.

In such an example, S152 may comprise determining which days of the week are empty, based on their date (which is known). In some examples, it may be determined, based on the determined empty weekdays, if consumption data (such as at least hourly reads and/or e.g. a Daily Read) is available for at least one same and/or similar weekday.

If it is determined that such consumption data is available, the determined available data (e.g. 48 half-hourly reads if available and/or a read for a period of at least a Half-Day (e.g. a Daily Read) if available) may be used at S153 to complete the data corresponding to the empty day.

If it is determined at S151 that there are no empty days or once S153 is performed, in the example of FIG. 3B, S154 may be performed where it may be determined whether all the days in the data have at least a read for a period of at least a Half-Day (e.g. a Daily Read). If it is determined at S154 that at least one day is missing e.g. a Daily Read, then S155 may be performed, where, for each day with the e.g. Daily Read missing, an average of the non-missing at least hourly consumption data may be calculated (e.g. the average of the half-hourly readings e.g. increased by 1), and the average may be multiplied by a corresponding coefficient to obtain the e.g. Daily Read (e.g. in the case where the half-hourly reads are averaged, the coefficient may be 48). The obtained value may be used at S156 to complete the missing data corresponding to the day.

If it is determined at S154 that there are no days missing a read for a period of at least a Half-Day (e.g. the Daily Read) or once S156 is performed, in the example of FIG. 3B, S157 may be performed where:

the days may be sorted based on the quantity of missing data (e.g. from fewest missing values to most missing values);

for each day:

if the current day has no missing values, then do nothing;

else if the current day has one missing value, then subtract the sum of the non-missing values from the e.g. Daily Read, and use the obtained value as the missing value. In some examples, where the obtained value is lower than a minimum of the existing at least hourly reads (e.g. 47 half-hourly reads), then the obtained value may be set it to this minimum;

else if all of the at least hourly reads (e.g. 48 half-hourly reads) are missing, then complete the data using the data of the day whose e.g. Daily Read is closest to the current day; and else find the closest day in terms of the sum of the absolute difference of the at least hourly reads, and complete the data using the data from this closest day.

In some examples, the above steps may be repeated until there are no further or significant changes in the data in an iteration. In some examples, at the end of S157, all the days have at least one at least hourly read (e.g. half-hourly read).

After S157, in the example of FIG. 3B, S158 may be performed where it is determined if there are still missing data. If it is determined at S158 that there are still missing data, S159 may be performed where any data missing from the previous steps may be completed. At S159, the data may be completed using e.g. a Halton Sequence for random number generation. At S159, for each day with missing values, a random non-missing value may be picked, and be used to complete the missing ones using e.g. the Halton Sequence.

Figure 4:
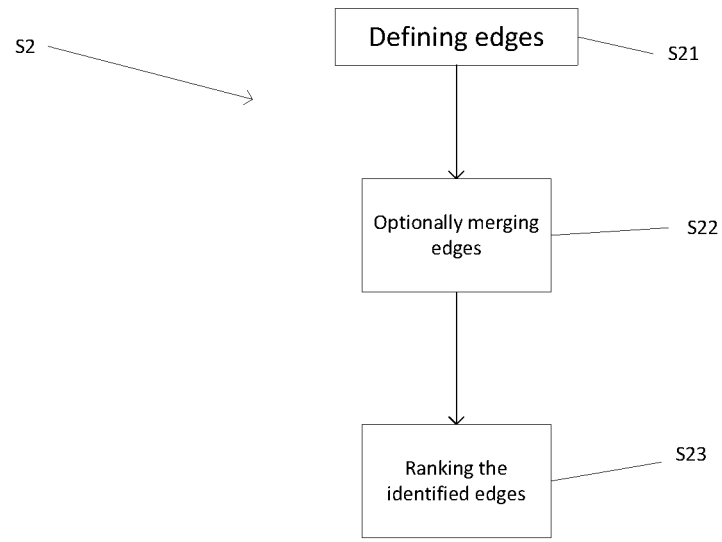
FIG. 4 shows a flow chart illustrating an example detail of a method according to the disclosure.

In the example of FIG. 4, S2 may comprise, at S21, defining edges between consecutive readings received from the meters. In some examples, S21 is performed for each of the meters 20.

Figure 5:
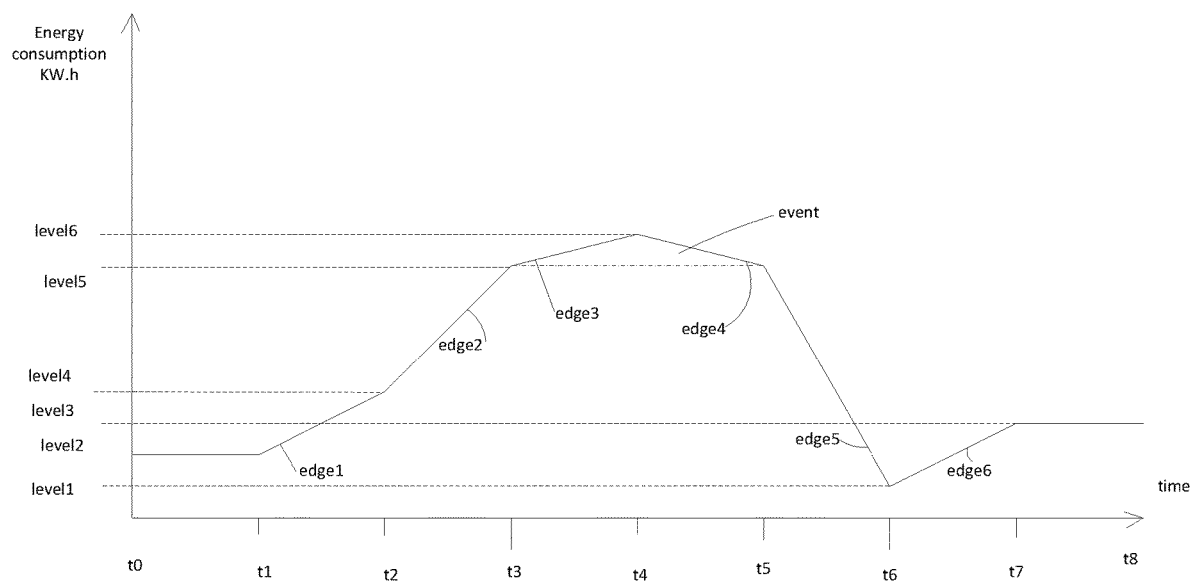
FIGS. 5, 6 and 7 schematically illustrate respective examples of a variation of the received energy consumption data (for example in kWh) over time.

FIG. 5 schematically illustrates an example of a variation of the received consumption data (for example in kWh), over time.

In the present disclosure, an edge corresponds to the difference of the energy consumption between two consecutive (i.e. contiguous) readings.

In the example of FIG. 5, readings are received at t0, t1, t2, t3, t4, t5, t6, t7 and t8. It is determined an edge1 between t1 and t2, an edge2 between t2 and t3, an edge3 between t3 and t4, an edge4 between t4 and t5, an edge6 between t6 and t6, and an edge6 between t6 and t7. No edge is determined between t0 and t1 or between t7 and t8 because there is no variation between those times.

Figure 6:
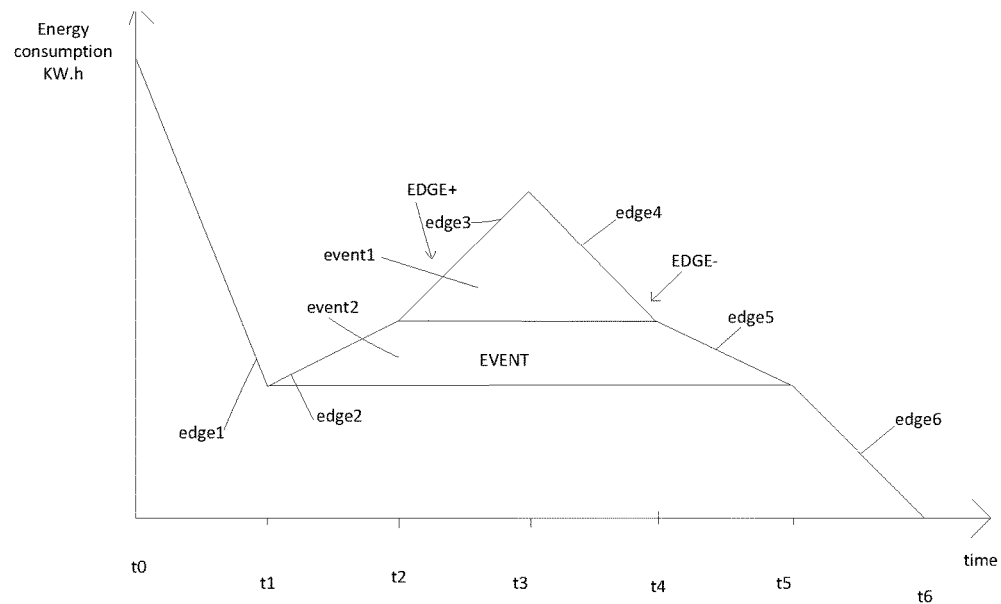

In the example of FIG. 6, readings are received at t0, t1, t2, t3, t4, t5 and t6. It is determined an edge1 between t0 and t1, an edge2 between t1 and t2, an edge3 between t2 and t3, an edge4 between t3 and t4, an edge5 between t4 and t5, and an edge6 between t5 and t6.

Figure 7:
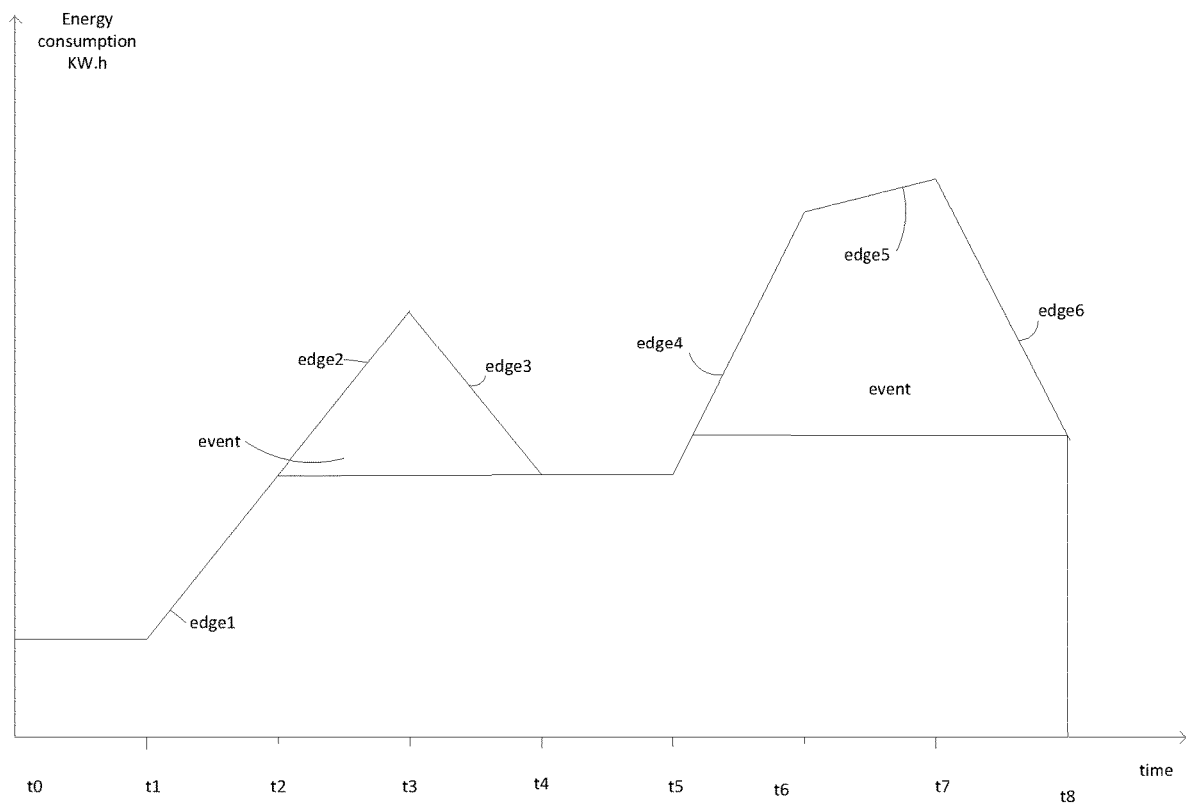

In the example of FIG. 7, readings are received at t0, t1, t2, t3, t4, t5, t6, t7 and t8. It is determined an edge1 between t1 and t2, an edge2 between t2 and t3, an edge3 between t3 and t4, and edge4 between t5 and t6 and an edge5 between t6 and t7 and an edge6 between t7 and t8 No edge is determined between t0 and t1 or between t4 and t5, because there is no variation between those times.

In the examples of FIGS. 5, 6 and 7, determining, in the received consumption data, one or more variations indicative of a switch on or a switch off a device comprises determining:

one or more on-edges, defined as edges which indicate that a device was on (in other words a positive variation); and one or more off-edges, defined as edges which indicate that a device was off (in other words a negative variation).

In other words, an on-edge defines an increase of consumption between two consecutive readings and an off-edge defines a decrease of consumption between two consecutive readings.

In some examples, the determining of the variations is based on a comparison of a ratio r with a threshold. In some examples, the ratio r may be defined by:

$$r = \frac{absolute\_value\_of\_difference\_in\_consumption\_for\_an\_edge}{basis\_level\_for\_the\_edge}.$$

In the example of FIG. 5, the ratio r redge1 for edge1 is calculated as follows:

$$redge1 = \frac{abs(level\ 4 - level\ 2)}{level\ 2}$$

The ratio r redge2 for edge2 is calculated as follows:

$$redge2 = \frac{abs(level\ 5 - level\ 4)}{level\ 4}$$

The ratio r redge5 for edge5 is calculated as follows:

$$redge5 = \frac{abs(level\ 1 - level\ 5)}{level\ 1}$$

An edge is considered as valid (or in other words significant) if the ratio r for the edge is greater than a predetermined threshold T1. For example, T1 may be comprised between 20% and 80%, as non-limiting examples. The edges for which the ratio r is below T1 are considered as non-significant and disregarded.

It is understood that if the value of T1 is set too high (for example greater than 80%), a great number of edges will be discarded as being non-valid (or non-significant). If the value of T1 is set too low (for example lower than 20%), the number of edges to process will be important, as numerous edges will be considered as significant.

In the example of FIG. 4, S2 may comprise, at S22, optionally merging a plurality of consecutive, similar, determined variations into a single edge. In some examples, if the relative difference between the ratios r of two consecutive edges is below a predetermined threshold T2, then the two consecutive edges are considered as one single edge. For example, T2 may be comprised between 20% and 40%, as non-limiting examples. If the relative difference is above T2, then the two edges are not merged.

In the example of FIG. 6, edge2 and edge3 may be merged together as EDGE+. Similarly, edge4 and edge5 may be merged together as EDGE−.

In the example of FIG. 4, S2 may comprise, at S23, ranking the identified edges based on their respective energy magnitude, for example from the largest identified edge to the smallest identified edge.

Alternatively or additionally, in some examples, some of the smallest determined edges may be discarded at S23, as non-significant to avoid processing too much data.

In the present disclosure, an event may be defined as a match between an on-edge and a corresponding off-edge. Below are described some examples of how the matching may be performed.

Figure 8:
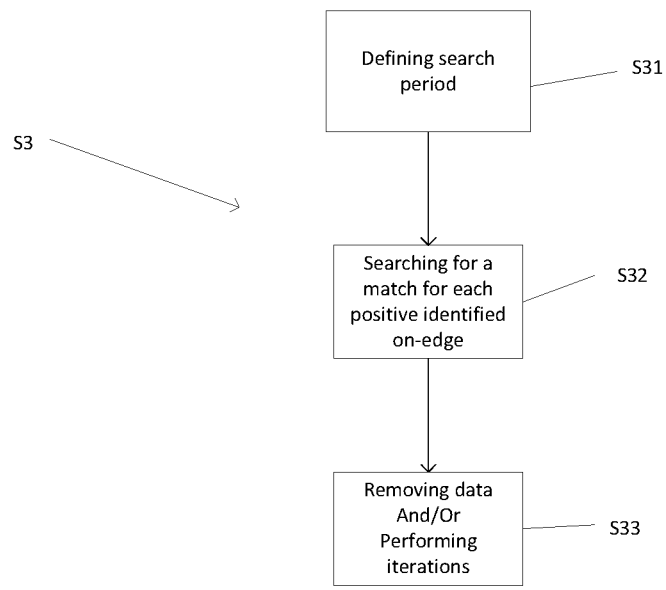
FIG. 8 shows a flow chart illustrating an example detail of a method according to the disclosure.

In the example of FIG. 8, S3 may comprise, at S31, defining a predetermined search period. The predetermined search period may correspond to the estimated maximum duration of an event, and the maximum search span for matching edges. The predetermined search period may be set for example at 24 hours (a day) as a non-limiting example.

For each on-edge, the method may comprise searching, within the predetermined search period, a matching off-edge among the off-edges.

In the example of FIG. 8, S3 may comprise, at S32, searching for a match to the positive variations (or on-edges) by iterations in successive turns, starting with the largest determined variation, and continuing in decreasing magnitude of variation.

In some examples, the matching can be performed based on similarity of basis level and/or magnitude of the ratio r and/or time of occurrence.

In the example of FIG. 5, the on-edges are as follows: edge1, edge2, edge3 and edge6. In the example of FIG. 5, the off-edges are as follows: edge4 and edge5.

The method starts with edge2 (largest of the edges), and it is determined that edge4 and edge5 are not matching off-edges, because they are not similar in magnitude of ratio r or close in time of occurrence. No match is found.

The method then turns to edge1, and it is determined that edge4 and edge5 are not matching off-edges, because they are not similar in magnitude of ratio r or close in time of occurrence. No match is found.

With respect to edge3, it is determined that edge4 is a matching off-edge, because it has a similar magnitude of ratio r (in the example of FIG. 4, the ratios for edge3 and edge4 are equal, although opposite in sign), and edge3 and edge4 happen at similar times, i.e. between t4 and t5, respectively.

In the example of FIG. 5, it is thus determined that edge3 and edge4 define an event.

In the example of FIG. 6, the on-edges are as follows: edge2 and edge3. In the example of FIG. 6, the off-edges are as follows: edge1, edge4, edge5 and edge 6.

With respect to edge3, the method determines that edge1, edge5 and edge6 are not matching off-edges, because they are not similar in magnitude of ratio r or close in time of occurrence. It is however determined that edge4 is a matching off-edge, because it has a similar magnitude of ratio r, and edge3 and edge4 happen at similar times, i.e. between t2 and t3 and between t3 and t4, respectively. In the example of FIG. 6, it is thus determined that edge3 and edge4 define an event1.

In the example of FIG. 7, the on-edges are as follows: edge1, edge2, edge4 and edge5. In the example of FIG. 7, the only off-edges are edge3 and edge6.

With respect to edge4, the method determines that edge6 is a matching off-edge, because it has a similar basis level.

In the example of FIG. 8, S3 may comprise, at S33, removing consumption data associated with an identified event from the search. In some examples, the removing S33 may occur even if S22 has been performed. Therefore, in the example of FIG. 7, it is determined that in the edge4 and edge6 define an event, regardless of edge5. In the example of FIG. 7, this means that the method may not try to find a match for edge 5, because edge5 is removed from the data when the event defined by edge4 and edge6 is identified. In the example of FIG. 7, the method thus proceeds with edge1, and the method determines that edge3 is not a matching off-edge, because it does not have a similar basis level. No match is found.

With respect to edge2 of FIG. 7, the method determines that edge3 is a matching off-edge, because it is similar in basis level, magnitude of ratio r and time of occurrence. In the example of FIG. 7, it is thus determined that edge2 and edge3 define an event.

Alternatively or additionally, in S33, the identifying can be performed by several iterations. In the example of FIG. 6, the event corresponding to matching edge3 and edge4 is first determined, the event corresponding to matching edges edge2 and edge5 being identified during a further iteration of the method.

Similarly, in the example of FIG. 7, once the method identifies an event defined by edge4 and edge6, the method may proceed to searching for a match for edge5 in a further iteration.

Alternatively or additionally, in the example of FIG. 7, EDGE+ may be matched to EDGE− and may define a single event referred to as EVENT.

In some examples the device of interest may be a kettle, and the method may identify, from electricity data collected by a smart meter, an event as being the kettle being switched on and then switched off. Alternatively or additionally, in some examples, the device of interest may be a flush or a washbasin, and the method may identify, from water data collected by a water meter, an event as being the flush or a washbasin being switched on and then switched off. Alternatively or additionally, in some examples the device of interest may be an oven, and the method may identify, from electricity data collected by a smart meter, an event as being the oven being switched on and then switched off.

Figure 9:
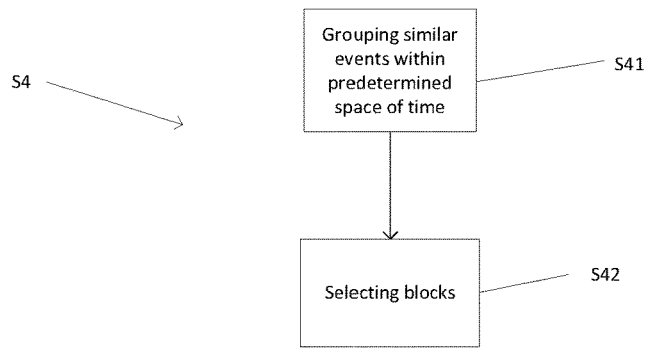
FIG. 9 shows a flow chart illustrating an example detail of a method according to the disclosure.

In the example of FIG. 9, S4 may comprise, at S41, grouping, based on the one or more devices of interest of the property, one or more events of similar magnitudes occurring within a predetermined space of time, to generate a block associated with a device of interest of the property.

In an example where the device of interest is a kettle being identified from electricity data collected by a smart meter, events with magnitudes much less than 2 kW (and corresponding to e.g. a fridge) are not grouped in a block corresponding to the kettle. In the example of the kettle, the predetermined space of time may be of the order of the minute, e.g. 5 minutes.

In an example where the device of interest is a flush or a washbasin being identified from water data collected by a water meter, events with magnitudes corresponding to e.g. 50 L or more (and corresponding to e.g. filling a bath) are not grouped in a block corresponding to the flush or the washbasin. In the example of the flush or the washbasin, the predetermined space of time may be of the order of the minute.

In an example where the device of interest is an oven being identified from electricity data collected by a smart meter, events with similar magnitudes and occurring within a predetermined space of time of the order of an hour, e.g. 2 hours, may be grouped in a block. The block may then correspond to e.g. an oven thermostat turning the oven heating element on and off, e.g. 10 times over an hour, to maintain the oven to a constant temperature.

In the example of FIG. 9, S4 may comprise, at S42, selecting, based on the one or more devices of interest of the property, blocks comprising a number of events comprised within a predetermined range of numbers of events.

In an example where the device of interest is a kettle being identified from electricity data collected by a smart meter, blocks containing large numbers of events (and corresponding to e.g. a washing machine) are not selected.

In an example where the device of interest is an oven being identified from electricity data collected by a smart meter, blocks containing large numbers of events (e.g. much more than 10 events over an hour) are not selected.

Figure 10:
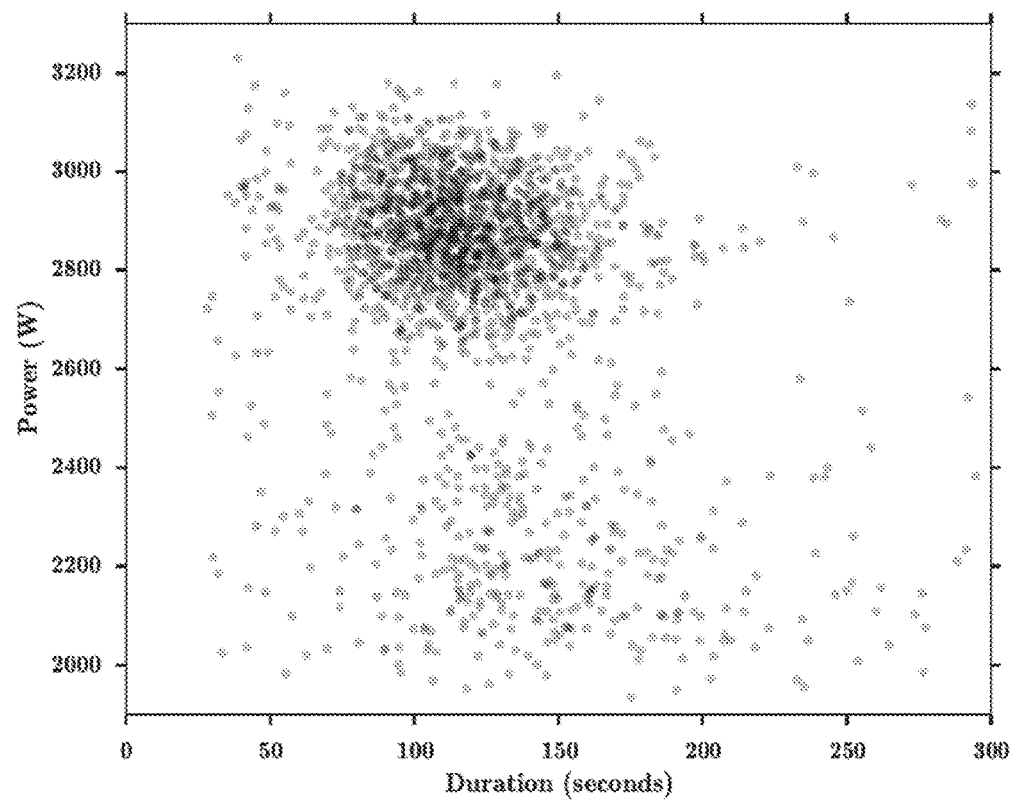
FIG. 10 schematically illustrates an example of a variance in power demand and duration of usage of 2000 different kettles.

It will be appreciated, e.g. from the example illustrated by FIG. 10, that, even for a given type of device of interest (such as the type kettle), different devices may have different features. FIG. 10 illustrates a high variance in the power demand and duration of usage of 2000 different kettles, learned from collected electricity data.

As explained below, the method may enable learning specific features for a device of interest of the property, to ensure accurate determination of an occurrence and/or an absence of usage of the device of interest of the property.

Figure 11:
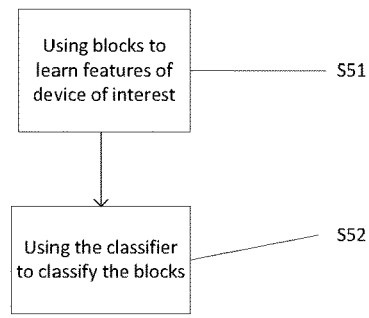
FIG. 11 shows a flow chart illustrating an example detail of a method according to the disclosure.

In some examples, S5 of FIG. 1 may comprise using a classifier. In some examples, and as illustrated in FIG. 11, the blocks are used, at S51, for learning the specific features of the specific device of interest of the specific property.

In some examples, the classifier may use at least one of:
  a Support Vector Machine; and/or
  a k nearest neighbours, k-NN, technique; and/or
  a Bayesian inference; and/or
  a vector classifier using a machine learning algorithm.

In some examples, the machine learning algorithm may use a model-based clustering and an expectation-maximization algorithm in an n-dimensional space. S51 may comprise using the blocks to generate the predetermined clusters. In some examples, the vector classifier using the expectation-maximization algorithm is configured to generate a single cluster associated with each device of interest of the property.

In an example where the device of interest is a kettle being identified from electricity data collected by a smart meter, the expectation-maximization algorithm may be initialized such that clusters are positioned close to typical power demands of kettles (as shown for example in FIG. 10).

In an example where the device of interest is a flush or a washbasin being identified from water data collected by a water meter, the expectation-maximization algorithm may be initialized such that clusters are positioned close to typical flow rates for flushes or washbasins.

In some examples, the n-dimensions may comprise at least one of:
  a time of the start and/or end of a block; and/or
  a magnitude of the events in a block; and/or
  a duration of a block and/or of the events in a block; and/or
  a number of events in a block.

Other dimensions may be envisaged. In examples, the dimensions comprise at least the magnitude of the event and the duration of the block.

It should be understood that in some examples, the vector classifier and/or some parameters may be based on the consumption data and/or on assumptions rather than learned from data (e.g. the consumption data). In some examples, the vector and/or the assumptions may be modified by parameters and/or modifiers learned from data (e.g. the consumption data).

Once the features of the device of interest of the property are learned at S51 as explained above, in some examples the blocks are also used for forming an input to the classifier. In some examples, S5 of FIG. 1 comprises, at S52, classifying each of the blocks as belonging to either the device of interest or to another device, using the classifier.

In some examples, S6 of FIG. 1 comprises determining:
  an occurrence of usage of the device of interest when a block has been classified in a cluster corresponding to the device of interest; or
  an absence of usage of the device of interest when a block has been classified in a cluster not corresponding to the device of interest.

Figure 12:
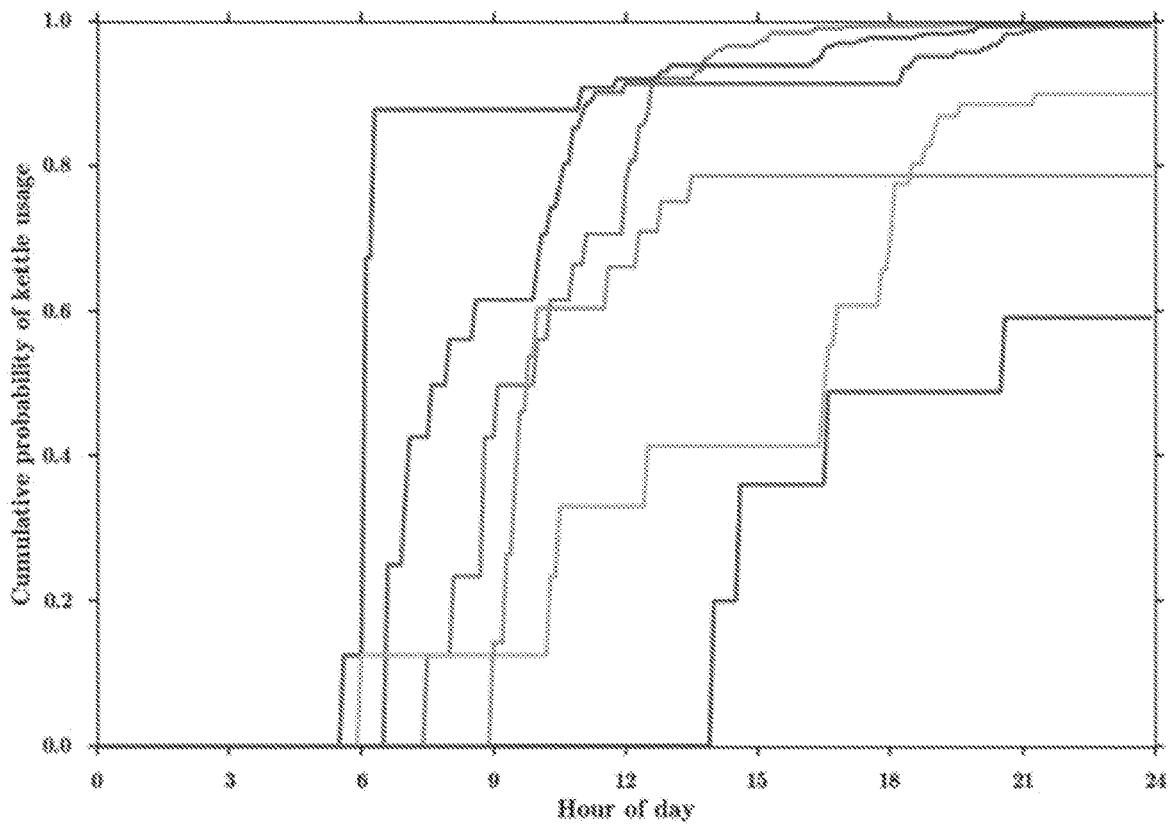
FIG. 12 schematically illustrates an example of cumulative probabilities of kettles being used at least once, across 6 different properties in the UK, during a day.

It will be appreciated, e.g. from the example illustrated by FIG. 12, that, for a given type of device of interest (such as the type kettle), users of different properties may have different usage patterns. As explained in greater detail below, FIG. 12 illustrates examples of cumulative probabilities of the kettle being used at least once, across 6 different properties in the UK. It can be seen that the probability increases rapidly early in the day for properties which regularly use the kettle during the morning, while the probability increases gradually and might not even converge to 1 in properties which use the kettle irregularly during the afternoon.

As explained below, the method may enable learning one or more specific usage patterns for the one or more devices of interest of the property, to ensure accurate determination of whether the determined occurrence and/or absence of usage of the one or more devices of interest of the property is associated with normal or abnormal usage.

Figure 13:
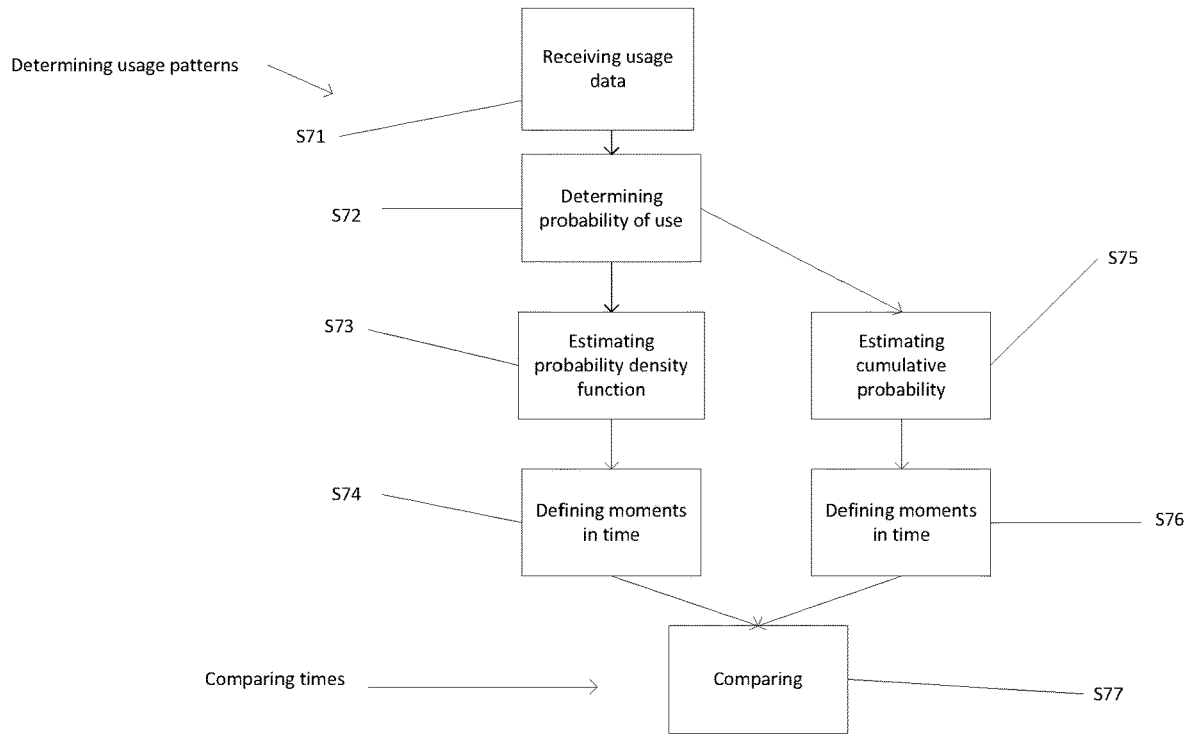
FIG. 13 shows a flow chart illustrating an example detail of a method according to the disclosure.

In some examples, and as illustrated in FIG. 13, S7 of FIG. 1 may comprise determining one or more usage patterns.

In some examples, determining one or more usage patterns may comprise, at S71, receiving usage data associated with one or more determined occurrences of usage of the one or more devices of interest of the property.

In some examples the usage data may be received for a predetermined observation period of time of at least one half day. In some examples the observation period of time may comprise one or more time divisions W, and the time divisions W may be divided into n time intervals $t_i$ shorter than an hour, with i an integer comprises between 1 and n. In some examples, the predetermined observation period of time may correspond to a period of at least one month, such as two months. In some examples, each time division W may correspond to a period of one week. In some examples, each time interval corresponds to a period of less than 15 minutes.

In FIG. 13 the method may comprise, at S72, retrospectively determining, in the received usage data, a probability of use of the one or more devices of interest within each of the n time intervals ti, by determining a ratio ri, with i an integer comprised between 1 and n, such that, for each device of interest of the property and for each time division W:

$$ri = \frac{number\_of\_times\_device\_of\_interest\_was\_used\_at\_least\_once\_in\_interval\_ti}{number\_of\_intervals\_ti\_in\_time\_division\_W}.$$

The method of FIG. 13 further comprises, at S73, for one or more subdivisions D (in some examples each time subdivision D corresponds to a period of one day) of one or more divisions W, estimating a usage probability density function of usage of the device of interest of the property.

Figure 14:
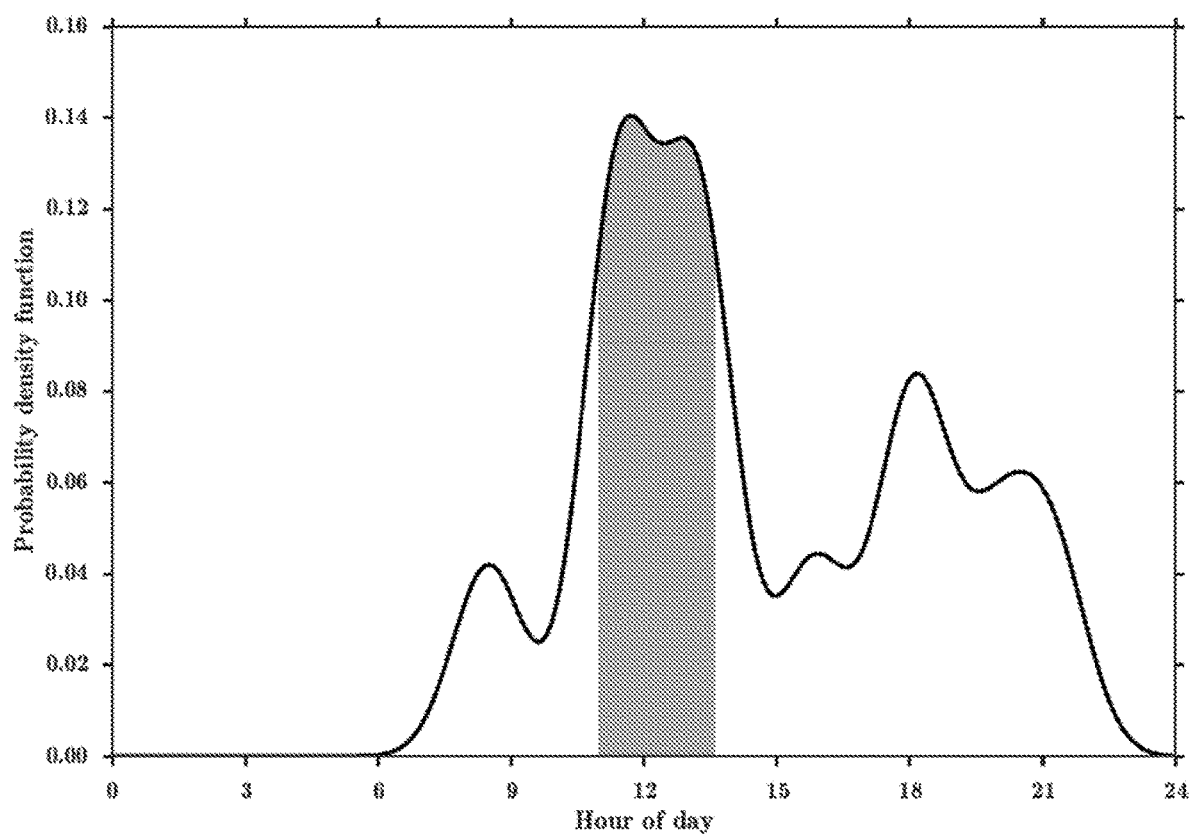
FIG. 14 schematically illustrates an example of a probability density function for usage of a kettle, as a function of time in day.

In some examples estimating the probability density function may comprise using a Kernel Density Estimation. An example of probability density function is illustrated in FIG. 14. As can be seen from FIG. 14, for a kettle of a specific property, the probability of the device (e.g. a kettle) being used between 12 pm and 2 pm is relatively high, and is calculated using the integral (i.e. colored area) of the probability density function on the 12 pm-2 pm interval. It will be appreciated that the probability of the device being used at 3 am or 5 am is null, and relatively small after 11 pm and late at night.

In some examples, the probability density function, which may be generated using e.g. the Kernel Density Estimation, may be used to detect uses of the kettle at unusual times.

The method of FIG. 13 further comprises, at S74, defining, based on the estimated usage probability density function, one or more predefined moments in time corresponding to times at which a determined occurrence of usage of the one or more devices of interest of the property is associated with abnormal usage, for example because the probability is below a predetermined probability threshold of e.g. 0.1 (other thresholds may be envisaged). For example, in FIG. 14, the probability of use of the e.g. kettle at 3 am and 5 am is null (i.e. below 0.1), and the probability of use of the kettle after 11 pm is also below the threshold of 0.1.

For example Table 1 below may be defined at S74, for a given D (i.e. day of the week such as Monday):

TABLE 1

| Time at which usage is detected | Status | Type of alarm signal |
|---|---|---|
| 3am | Abnormal | First type of alarm signal |
| 5am | Abnormal | Second type of alarm signal |
| 6am | Normal | None |
| 9am | Normal | None |
| 12pm | Normal | None |
| 3pm | Normal | None |
| 11pm | Abnormal | Third type of alarm signal |

It will thus be appreciated that in some examples the learned pattern may be used to detect deviations from the normal usage pattern, such an occurrence of usage of the kettle during the night or late at night.

In FIG. 13 the method may comprise, at S75 performed after S72, for one or more subdivisions D of one or more divisions W, estimating a cumulative probability CPαi that the one or more devices of interest of the property is used at least once within a given period Hαi of time (such as corresponding to a time of the day) within a subdivision D (such as a day). In some examples the period of time Hαi starts at a beginning of a predetermined reference time interval tM associated with the start of the subdivision D (for example midnight), and ends at an end of a time interval ti (corresponding, for example, to 3 am, 9 am or 3 pm, such that Hαi corresponds to a time of the day). Other periods Hαi may be envisaged.

In some examples, the cumulative probability CPαi that the one or more devices of interest of the property is used within the given period Hαi of time is calculated such that:

$$CPai = 1 - \prod_{j=M}^{i} 1 - rj$$

As can be seen from FIG. 12, for the kettle of the first specific property, for a given D (i.e. day of the week such as Monday):

TABLE 2

| Hαi | CPαi |
|---|---|
| H3am | 0 |
| H5.45am | 0.1 |
| H6am | 0.7 |
| H9am | 0.85 |
| H12pm | 0.9 |
| H9pm | 1 |

In the example of FIG. 13, at S75, a probability that the one or more devices of interest of the property is not used within the given period Hαi of time may optionally be calculated, based on the estimated cumulative probability. For example the probability that the kettle is not used by H9 am may be calculated as being equal to 0.15.

In some examples, the cumulative probability of usage of the device (such as the kettle) may be used to identify moments in time (e.g. corresponding to times of day) by which device usage would be expected. In some examples, the cumulative probability of usage of the device and/or the moments in time may be used to raise an intervention (if the device has not been used).

The method of FIG. 13 further comprises, defining, at S76, based on the given periods Hαi of time and one or more estimated cumulative probabilities (such as CPαi), one or more predefined moments in time corresponding to times by which a determined absence of usage of the one or more devices of interest of the property is associated with abnormal usage, for example because the probability is below a predetermined probability threshold of e.g. 0.15 (other thresholds may be envisaged).

For example, from Table 2, Table 3 below may be defined:

TABLE 3

| Time by which no usage is detected | Status | Type of alarm signal |
|---|---|---|
| 3am | Normal | None |
| 9am | Abnormal | First type of alarm signal |
| 6pm | Abnormal | Second type of alarm signal |
| 9pm | Abnormal | Third type of alarm signal |

It will thus be appreciated that in some examples the learned pattern may be used to detect deviations from the normal usage pattern, such an absence of usage of the kettle during the day.

As can be seen from Table 1 and Table 3 above, the one or more predefined moments may comprise, for each device of interest of the property, different types of times causing output of different types of alarm signals. The different types of alarm signals may enable taking into account the seriousness of the abnormal usage, depending on the device of interest.

In the case of Table 1, the first type of alarm signal may cause a visit to the property from a carer, the second type of alarm signal may cause a text message being sent to a relative, and the third type of alarm signal may cause a phone call to a professional carer.

In the case of Table 3, the first type of alarm signal may cause a text message being sent to a relative, the second type of alarm signal may cause a phone call to a relative, and the third type of alarm signal may cause a visit to the property by a professional carer.

In some examples, and as illustrated in FIG. 13, S7 of FIG. 1 may comprise, at S77, comparing a time of determination of an absence or occurrence with the moments in time defined at S74 or S76 described above. If an absence or an occurrence of usage is determined, the one or more moments in time are compared with the one or more predefined moments in time.

At S8, it may be determined that the determined absence of usage is associated with abnormal usage if the one or more moments in time by which the absence of usage is determined is later than at least one of the predefined moments in time.

Alternatively or additionally, it may be determined at S8 that the determined occurrence of usage is associated with abnormal usage if the one or more moments in time at which the occurrence of usage is determined is similar to at least one of the predefined moments in time.

The disclosure may have other applications, such as grid management, energy consumption management, guidance to clients (for example for non-peak times), trend analysis, as non-limiting examples.

Modifications and Variations

In some examples, the links 30 and 40 may be any communications network (such as the Internet or a mobile telephony network, using technology such as wired, such as cable and/or Ethernet, or wireless, such as mobile telephony or Wi-Fi technologies, as non-limiting examples.

In example embodiments, the system 10 may be configured as one or more networks. Additionally, networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In example embodiments, elements of the system 10 may be coupled to one another through one or more interfaces employing any suitable connection (wired or wireless), which provides a viable pathway for electronic communications. Additionally, any one or more of these elements may be combined or removed from the architecture based on particular configuration needs. The system 10 may include a configuration capable of transmission control protocol/Internet protocol (TCP/IP) communications for the electronic transmission or reception of packets in a network. The system 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various elements.

In example embodiments, components of the system 10 may use specialized applications and hardware. The system 10 can use Internet protocol (IP) technology.

In example implementations, at least some portions of the system 10 may be implemented in software. In some embodiments, one or more of these portions may be implemented in hardware, provided external to these elements, or consolidated in any appropriate manner to achieve the intended functionality. In still other embodiments, these elements may include any suitable algorithms, hardware, software, components, modules, interfaces, or objects that facilitate the operations thereof.

In a particular implementation, the system 10 is a server provisioned to perform the activities discussed herein. A server may be located on a single real or virtual location, but may also distributed on a number of different real or virtual locations.

In some of example embodiments, one or more memory elements (e.g., the memory element 11) can store data used for the operations described herein. This includes the memory element being able to store software, logic, code, or processor instructions that are executed to carry out the activities described in this disclosure.

A processor can execute any type of instructions associated with the data to achieve the operations detailed herein in this disclosure. In one example, the processor 12 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, components in the system 10 can include one or more memory elements (e.g., the memory element 11) for storing information to be used in achieving the operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this disclosure should be construed as being encompassed within the broad term 'processor.'

Additionally, some of the processors and memory elements associated with the system may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. Countless possible design configurations can be used to achieve the operational objectives outlined here. Accordingly, the associated infrastructure has a myriad of substitute arrangements, design choices, device possibilities, hardware configurations, software implementations, equipment options, etc.

Although the present disclosure has been described in detail with reference to particular arrangements and configurations, these example configurations and arrangements may be changed significantly without departing from the scope of the present disclosure.

The invention claimed is:

1. A computer-implemented method performed by at least one processor comprising:
   receiving consumption data comprising readings from one or more utility meters associated with a property comprising one or more devices, the one or more devices comprising one or more devices of interest;
   determining, in the received consumption data, one or more positive consumption variations indicative of switching on of one or more of the devices and/or one or more negative consumption variations indicative of switching off of one or more of the devices;
   identifying a plurality of events associated with the one or more devices, based on the determined variations, each event identified by matching one or more positive variations with one or more negative variations;
   grouping the identified events into one or more blocks, each block corresponding to an occurrence of usage of a device of the property, wherein the grouping comprises: grouping events of similar magnitudes occurring within a predetermined space of time, to generate a block associated with a device of interest of the property;
   classifying the one or more blocks into one or more predetermined clusters, the one or more predetermined clusters comprising a respective predetermined cluster associated with each device of interest of the property, wherein the classifying comprises, for each block being classified, using a vector classifier using a model-based clustering and an expectation-maximization algorithm in an n-dimensional space to classify the block,
   wherein, for a given one of said blocks formed in the grouping step, the given block comprising multiple events, each event corresponding to matched positive and negative power consumption variations as identified in the identifying step, the n dimensions input to the vector classifier comprise at least one of:
      a time of the start of the given block of multiple events;
      a time of the end of the given block of multiple events;
      a duration of the given block of multiple events; and
      a number of events in the given block of multiple events;
   determining an occurrence and/or an absence of usage of the one or more devices of interest of the property, based on the classification into the one or more predetermined clusters;
   comparing the determined occurrence and/or absence of usage of the one or more devices of interest of the property with one or more predetermined usage patterns associated with the one or more devices of interest of the property;
   determining whether the determined occurrence and/or absence of usage of the one or more devices of interest of the property is associated with normal or abnormal usage, based on the comparison, wherein the comparing and determining whether the determined occurrence and/or absence of usage of the one or more devices steps comprise:
      determining a detection time indicating one of: a time in an observation period at which occurrence of usage was detected; and a time period in the observation period during which an absence of usage was detected, and identifying the occurrence or absence of usage as normal or abnormal based on the detection time and probability information indicating probabilities of usage of the device over the observation period; and
   based on the detection time and on whether the occurrence and/or absence of usage was determined as normal or abnormal;
      causing output of a selected one of a plurality of predetermined alarm signal types when determined as abnormal, wherein the selected alarm signal type comprises one of: a first type of alarm signal to cause a communication to a relative; a second type of alarm signal to cause a communication to a professional caregiver; and a third type of alarm signal to cause a visit to the property by the professional caregiver; or
      not causing output of any type of alarm signal when determined normal.

2. The method of claim 1, further comprising:
   receiving, from a user of the property and/or an operator, a cancellation signal overriding the one or more output alarm signals.

3. The method of claim 1, wherein classifying the one or more blocks into one or more predetermined clusters further comprises using a classifier using at least one of:
   a Support Vector Machine,
   a k-nearest neighbours (k-NN) technique, and/or
   a Bayesian inference.

4. The method of claim 3, wherein the vector classifier using the expectation-maximization algorithm is configured to generate a single cluster associated with each device of interest of the property, wherein the vector classifier using expectation-maximization in an n-dimensional space is based on the consumption data and/or on a set of predetermined assumptions, wherein the vector and/or the assumptions are modified by parameters and/or modifiers based on the consumption data and/or on a set of predetermined assumptions.

5. The method of claim 1, wherein grouping the identified one or more events into one or more blocks comprises:
selecting, based on the one or more devices of interest of the property, blocks comprising a number of events comprised within a predetermined range of numbers of events.

6. The method of claim 1, further comprising determining one or more usage patterns, comprising:
receiving usage data associated with one or more determined occurrences of usage of the one or more devices of interest of the property, the usage data being received for a predetermined observation period of time of at least one half day, the observation period of time comprising one or more time divisions W divided into n time intervals $t_i$ shorter than an hour, with i being an integer between 1 and n;
retrospectively determining, in the received usage data, the probability of use of the one or more devices of interest within each of the n time intervals $t_i$, by determining a usage ratio $r_i$, with i being an integer between 1 and n, such that, for each device of interest of the property and for each time division W:

$$ri = \frac{\text{number of times device of interest was used at least once in interval } t_i}{\text{number of intervals } t_i \text{ in time division } W}.$$

7. The method of claim 6, further comprising at least one of, for one or more subdivisions D of one or more divisions W:
estimating, based on the determined probability of use, a usage probability density function of usage of the device of interest of the property, wherein estimating the probability density function comprises using a Kernel Density Estimation, or
defining, based on the estimated usage probability density function, one or more predefined moments in time corresponding to times at which a determined occurrence of usage of the one or more devices of interest of the property is associated with abnormal usage.

8. The method of claim 6, further comprising, for one or more subdivisions D of one or more divisions W:
estimating a cumulative probability $CP_{\alpha i}$ that the one or more devices of interest of the property is used within a given period $H_{\alpha i}$ of time within a subdivision D, wherein the period of time $H_{\alpha i}$:
starting at a beginning of first time interval being a predetermined reference time interval $t_M$ associated with the start of the subdivision D, and
ending at an end of a second time interval $t_i$, wherein M and i are respective indices identifying the first and second time intervals;

such that:

$$CP\alpha i = 1 - \prod_{j=M}^{i} 1 - rj.$$

wherein $r_j$ is the usage ratio for index j.

9. The method of claim 8, further comprising at least one of:
estimating the cumulative probability that the one or more devices of interest of the property is not used within the given period $H_{\alpha i}$ of time within the subdivision D, based on the estimated cumulative probability, or defining, based on the given periods $H_{\alpha i}$ and one or more of the estimated cumulative probabilities, one or more predefined moments in time corresponding to times by which a determined absence of usage of the one or more devices of interest of the property is associated with abnormal usage, or comparing one or more moments in time at which the absence and/or occurrence of usage is determined with the one or more predefined moments in time.

10. The method of claim 1, wherein determining whether the determined absence of usage of the one or more devices of interest of the property is associated with normal or abnormal usage comprises:
determining that the determined absence of usage is associated with abnormal usage if one or more moments in time by which the absence of usage is determined is later than at least one of a predefined moments in time.

11. The method of claim 1, wherein determining whether the determined occurrence of usage of the one or more devices of interest of the property is associated with normal or abnormal usage comprises:
determining that the determined occurrence of usage is associated with abnormal usage if one or more moments in time at which the occurrence of usage is determined is similar to at least one of a predefined moments in time.

12. The method of claim 7, wherein the one or more predefined moments comprise, for each device of interest of the property, different types of times causing output of different types of alarm signals.

13. The method of claim 1, wherein the determining of the consumption variations comprises, at least one of:
defining edges between consecutive readings received from the utility meters, or merging a plurality of consecutive similar determined variations.

14. The method of claim 1, wherein the identifying of the one or more events comprises at least one of:
ranking the identified variations based on their respective energy magnitude,
searching for matching variations within a predetermined search period,
searching for a match to the positive variations by iterations in successive turns, starting with the largest magnitude determined variation and continuing in decreasing magnitude of variation,
removing consumption data associated with an identified event from the received consumption data, or
performing one or more iterations on the consumption data.

15. The method of claim 1, wherein the utility meter comprises at least one of:

a gas meter;
an electricity meter;
a water meter;
a bandwidth meter.

16. The method of claim 1, wherein the one or more output alarm signals cause one or more of:
   an intervention being triggered in the property;
   a message being sent to a user of the property; and/or to an operator.

17. The method of claim 1, wherein the one or more devices of interest comprises, one or more of the following:
   a heating system,
   a cooling system,
   a lighting system,
   an appliance, and/or
   a water access point.

18. A non-transitory computer readable medium comprising software code adapted, when executed on a data processing apparatus, to perform the method as set out in claim 1.

19. A system comprising a processor and associated memory configured for performing the method as set out in claim 1.

20. An apparatus comprising a processor and associated memory configured for performing the method as set out in claim 1.

* * * * *